United States Patent [19]

Ryan

[11] Patent Number: 4,589,463
[45] Date of Patent: May 20, 1986

[54] EXPANDABLE VOLUME LAVATORY

[75] Inventor: James M. Ryan, New York, N.Y.

[73] Assignee: Falcon Jet Corporation, Teterboro, N.J.

[21] Appl. No.: 655,517

[22] Filed: Sep. 28, 1984

[51] Int. Cl.$^4$ .......................... E06B 3/32; E05D 15/00
[52] U.S. Cl. ........................................ 160/88; 160/210
[58] Field of Search ................. 52/64, 65, 70, 71, 201; 49/39; 160/206, 210, 213, 88–93, 229 R, 352; 296/26, 27

[56] References Cited

U.S. PATENT DOCUMENTS

| | | | |
|---|---|---|---|
| 436,066 | 9/1890 | Fredrickson | 52/201 |
| 586,896 | 7/1897 | Carroll | 52/201 |
| 640,700 | 1/1900 | Reece | 160/229 R |
| 1,345,147 | 6/1920 | Donovan | 160/229 R |
| 1,605,017 | 11/1926 | Wakefield | 52/65 |
| 2,690,797 | 10/1954 | Eriksen | 52/201 |
| 3,108,820 | 10/1963 | Rich | 52/65 |
| 3,541,750 | 11/1970 | Ritter | 52/65 |
| 4,008,546 | 2/1977 | Bourboulis | 52/65 |

Primary Examiner—William F. Pate, III
Assistant Examiner—John Malcolm White
Attorney, Agent, or Firm—Morgan, Finnegan, Pine, Foley & Lee

[57] ABSTRACT

An expandable volume lavatory is enclosed by a three-panel two-position hinged door. When the lavatory is unoccupied, two adjacent panels of the door may be positioned to fit flush with the surrounding wall or enclosure. When occupied, repositioning of the third panel of the door reconfigures the door to increase available lavatory space. The expandable volume lavatory has particular utility in areas where space is at a premium, particularly on board a vehicle such as an aicraft.

11 Claims, 5 Drawing Figures

4,589,463

EXPANDABLE VOLUME LAVATORY

BACKGROUND OF THE INVENTION

The invention pertains to lavatories. More particularly, the invention pertains to vehicular lavatories having an expandable volume.

Many actual and potential situations are known or may be imagined where a room, such as a lavatory, might be provided in an area where space is at a premium. For example, in corporate class jet aircraft it is often desirable to provide a forward lavatory for use by the crew. With the auxiliary lavatory, the crew would not be forced to intrude on passenger privacy en route to the standard passenger lavatory typically located in the aft section of the jet aircraft. However, as is commonly the situation aboard aircraft, space is very much at a premium in the forward area near the cockpit, and the space required for a full size lavatory in that area typically precludes the installation of a lavatory for the use of the crew.

Similarly, in other transport vehicles, such as campers and trains, where space is also at a premium, the volume required for a lavatory might otherwise preclude the installation of an additional or auxillary lavatory.

Furthermore, even on land, situations may be easily imagined where it would be desirable to include a lavatory where the space might be deemed insufficient.

It is known to provide double hinged doors for such functions as causing a door to open in a smaller space than a conventional door (see U.S. Pat. No. 4,296,791 to Chaumat et al (1981) entitled Folding Door or Like Closure Device) or to reduce the effect of a draft on an open door (see U.S. Pat. No. 821,201 to Taylor (1906) entitled Door, Window, and the Like.) However, it has not heretofore been known to employ multiply hinged doors to expand the effective volume of enclosure when the enclosed room is occupied.

Multiple edged windows have been provided in automobiles (see U.S. Pat. No. 1,745,299 to Holan 1930) and in locomotives (see U.S. Pat. Nos. 2,333,574 (Kaufman 1943) and 2,690,797 (Eriksen 1954)). Such hinged windows were provided to protect the head of a person who desired to look backwards or forwards the path of the vehicle from a position about the middle of the vehicle as an alternative to having the person's head dangle in free space.

It is not believed that doubly hinged doors have ever been provided aboard vehicles to reconfigure space distribution. Multiple hinged door apparatuses of the type described in U.S. Pat. No. 2,412,871 by Clark (1946) merely provide retractable bus-type doors which retract to allow passenger ingress and egress, but do not reallocate space. Singly hinged doors have been provided to effect space distribution in U.S. Pat. Nos. 160,079 (Bridgman 1875) and 2,681,016 (Candlin 1954).

It is believed that there has never been heretofore provided a door apparatus which increases the essential volume of enclosure of a room when occupied. It is further believed that such an apparatus has in particular never heretofore been provided aboard a vehicle. It is further particularly believed that there has never heretofore been provided an apparatus for increasing the useful volume of a lavatory, particularly one found onboard an aircraft.

It is therefore an object of the invention to provide a hinged door mechanism which will lay flush against the surrounding enclosure when the room is in its unoccupied position but which may be readjusted to increase the available space within the room when the room is occupied.

It is a further object of the invention to provide a hinged door assembly which will expand and contract the useful volume of a lavatory.

It is still a further object of the invention to provide a lavatory such as may be used on board an aircraft having a hinged door assembly which closes flush with the door when the door is in its unoccupied configuration and which may be repositioned to increase the available lavatory space when the lavatory is in its occupied configuration.

SUMMARY OF THE INVENTION

These and other objects of the invention are met by providing a room, such as a lavatory, enclosed by a two-position hinged door. In an unoccupied configuration, the door fits flush with the door frame. In an occupied configuration, the operation of a hinged door flap section repositions the door to increase the available space. The door comprises a first hinged component hingeable along one side of a door frame, a second hinged component hinged to said first hinged component at the end opposite from which said first hinged component may be hinged to the door frame, and a third door flap component hingably connected to the second hinged component at the opposite edge thereof from the hinged connection to said first hinged component. In its unoccupied configuration, the first and second hinged components are aligned, thereby creating a substantially smooth surface with the surrounding door frame. In its occupied configuration, the third door flap component is unfolded, repositioning the door and expanding the useful volume or space of the enclosure.

BRIEF DESCRIPTION OF THE DRAWINGS

The invention will be more fully explained below, including by way of reference to the following drawings, in which.

DETAILED DESCRIPTION OF THE DRAWINGS

Figure 1:
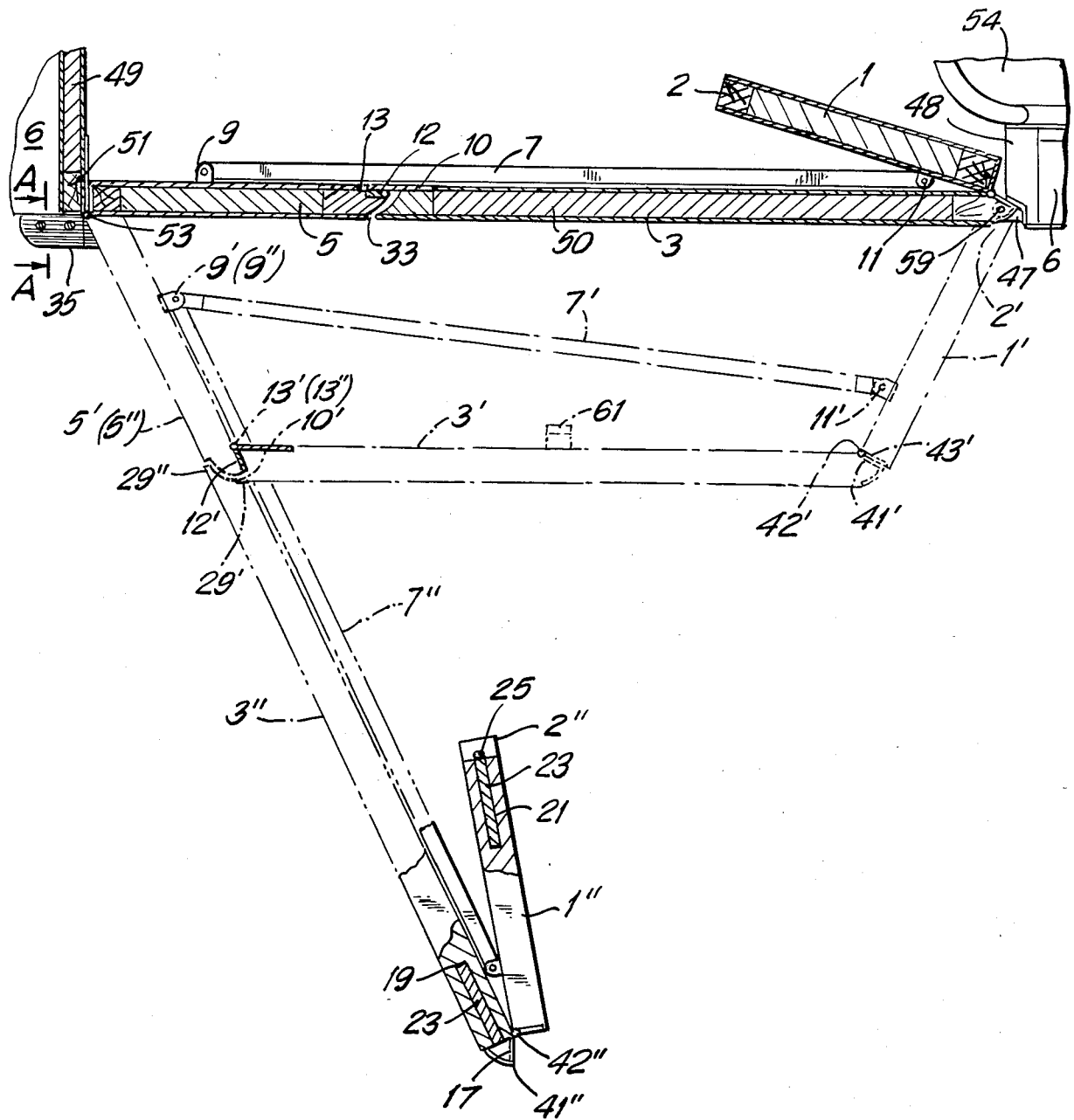
FIG. 1 is a top view cut-away drawing illustrating a triply hinged door in accordance with the instant invention, shown in its unoccupied, intermediate and occupied configurations.

FIG. 1 illustrates an embodiment of the invention as it may be provided about a vehicular lavatory, such as on board an airplane.

First, second and third door panel components 1, 3 and 5, respectively, are shown in their unoccupied configuration such that second door panel component 3 and third door panel component 5 are linearly aligned and co-planer and present a substantially contiguous surface along with the surrounding frame 6 when the door is closed. Note that in this unoccupied configuration, first door panel component 1 is withdrawn in a tuck position behind the door, forming an acute angle with second door panel component 3.

FIG. 1 also illustrates the door assembly according to the instant invention in an occupied configuration wherein first door panel component 1', which acts as a door flap, is repositioned so that the end 2' thereof comes in contact with fixed keeper portion 47 and wherein second and third door panel components 3', 5' are repositioned at an obtuse angle respective each other to provide an expanded volume of enclosure along with first door panel component 1' which likewise forms an obtuse angle respective second door panel component 3'.

FIG. 1 further illustrates door segments 1", 3" and 5" in their intermediate open position such as would be provided during user ingress and egress from the enclosure area. Note that in the intermediate configuration, second door panel component 3' and third door panel component 5' may be aligned co-planer.

Thus, first, second and third door panel components are referred to in FIG. 1 in their un-occupied configuration as 1, 3, and 5; in their occupied configuration as 1', 3', 5'; and in their open intermediate configuration as 1", 3" and 5".

It may be noted that third door hinge panel 5 (5', 5") is hingably secured via hinge 53 to a solid edged mating portion 51 of honeycombed bulkhead 49. Third hinged door panel 5 is shown squared about the edge where it is secured to mating portion 51 through hinge 53. The squared edge provides a close fit with mating portion 51 when the door is in its unoccupied configuration.

Figure 3:
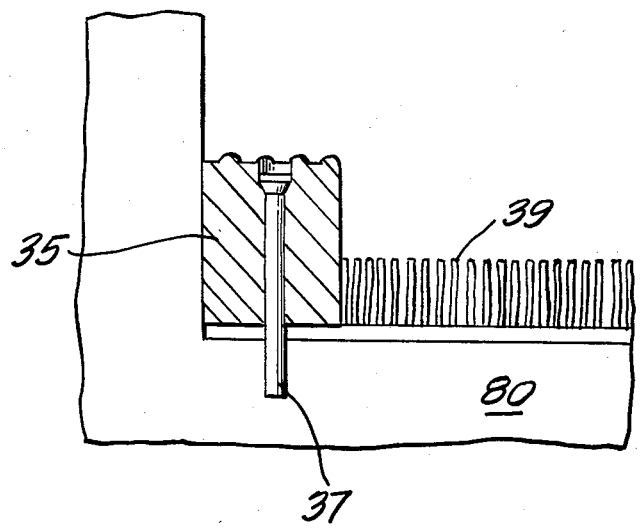
FIG. 3 is cut-away drawing taken along the line A—A of FIG. 1 illustrating a door stop section such as may be provided in one embodiment of the invention.

A floor mounted doorstop 35 may be provided as is illustrated in FIGS. 1 and 3 which will prevent the door assembly from swinging past a desired range as the door is being opened. FIG. 3 illustrates the door stop section taken along the line A—A of FIG. 1 and illustrates doorstop section 35 of a solid construction, fastening means 37 for securing doorstop 35 to floor 80, and surrounding carpet 39. Doorstops may likewise be provided elsewhere on the floor or ceiling to prevent the door from swinging past a certain point where the door might, for example, engage the curvature of an aircraft ceiling.

Further referring to FIG. 1, third hinged door panel 5' is further shown pivotally connected to second hinged door panel 3' by hinge means 13'. Hinge means 13' includes leaves 12' and 10' coupled respectively to a third hinged door panel 5' and second hinged door panel 3'.

Third door panel 5' includes an elbow about the edge where it encounters second door panel 3'. The elbow has a flat edge and a curved edge. Second door panel 3' is recessed about its corresponding edge in a curved manner to receive the elbow portion of the third door panel 5'. One of the hinge leaves 12' is secured to the flat portions of the elbow of third door panel 3' while the other of the hinge leaves 10' is secured to a flat portion of second door panel 3' adjacent the curved receiving edge. Because an otherwise large gap would be resultant between second and third door panels when the door is in its occupied configurations, a lip 29' extends from the second door panel 3' to conceal the gap. Although this hinge arrangement is preferred, it is by no means the only arrangement operable within the scope of the invention.

Hinge 13 may be a piano hinge and may extend substantially the entire length of the door. A covering material such as veneer may be provided to cover the hinge 13 thereby providing a more asthetically pleasing appearance to the occupant of the enclosed room as well as concealing the hinge from the effect of atmospheric dust. Note that the hinge 13 between second hinged door panel 3 and third hinged door panel 5 must be capable of providing a 180 degree angle between the two hinged door panels.

A similar piano-type hinge 42 is provided between first hinged door panel 1' and second hinged door panel 3'. Piano hinge 42 must be provided such that leave 43 secured to first hinged door panel 1' will meet squarely with leave 41 secured to second hinged door panel 3.

When the door is in its occupied configuration, on the other hand, the hinge must allow first door panel 1 (1") to be tucked back when the door is in its unoccupied or intermediate configuration.

A second contact point must also be provided about the edge of the second door panel 3' which meets the first door panel 1 whereby the second hinged door panel 3 may be kept in an unoccupied configuration about keeper means 47 secured to door frame or wall 6. To this end, latching means, such as an Adams Rite Latch No. AR26, illustrated in FIG. 2 may be provided in latch cut-out 19. Similarly, latching means such as an Adams Rite Latch 23 may be provided within cut-out 21 within the mating end 2" of first hinged door panel 1 whereby the first hinged door panel may securely mated with keeper means 47 through apperature 59 when the door is in its occupied configuration.

Figure 2:
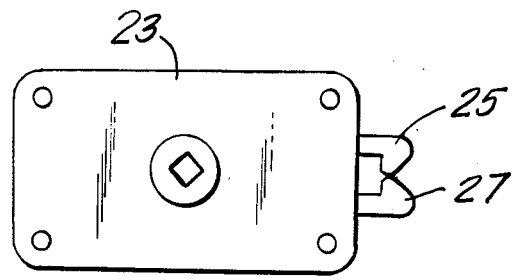
FIG. 2 illustrates a latching mechanism such as may be provided within the second and third door components.
Figure 4:
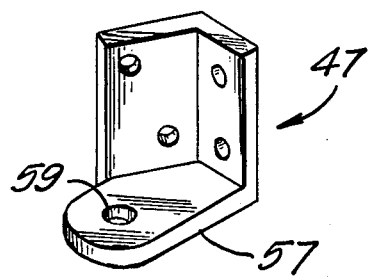
FIG. 4 illustrates a keeper means for engaging the door latches.

FIG. 2 illustrates an Adams Rite Latch 23 comprising upper and lower jaws 25, 27 for latchably connecting the first and second hinged door panels 1', 3 about keeping means 47, particularly within apperature 59 provided therein. FIG. 4 illustrates detailed top and side perspective views of a keeper means 47 including apperature 59.

A local cut 17 may be provided within hinge mating surface 41" of hinge 42" to allow for clearance of the keeper 47 through hinge 42" to provide access to the jaws 25, 27 of hinge 23 when the door is being placed in its unoccupied configuration, i.e., when the latching means 23 of second hinged door panel 3" are moved into their latched position about keeper means 47, the second hinged door panel 3 and third hinged door panel 5 then being aligned co-planer in their unoccupied configuration.

Harness 7 (7', 7") is provided in the embodiment disclosed in FIG. 1 and connects first hinged door panel 1 (1', 1") and third hinged door panel 5 (5', 5") at brackets 11 (11', 11") and 9 (9', 9") respectively. The length of harness 7 and the positioning thereof about first and third door segments 1, 5 via brackets 11, 9 may be such that it will allow second hinged door panel 3 and third hinged door panel 5 to be aligned co-planer while simultaneously causing first hinged door panel 1, 1" to be drawn into a tuck position in the unoccupied and intermediate configuration. The configuration of harness 7 (7', 7") is further provided such that when the door according to the embodiment of FIG. 1 is in its occupied configuration, the harness will reconfigure first hinged door panel 1 (1', 1") so that it may be latchably engaged about keeping means 47. Thus, harness 7 (7', 7") serves as a brace for the hinged door panels in each of their occupied, unoccupied or open/intermediate configurations.

In one perferred embodiment of the invention, harness 7 is approximately 18.69" long, 1" high and 0.375" wide and formed of an aluminum extrusion. Further in this embodiment, second hinged section 3 measures 16.5" across while first and third hinged door panels 1, 5 measure 7.5 inches and 7.06 inches across, respectively. The extruded aluminum harness 7 may be substantially hollow comprising a 0.125 inch radial aluminum content thereabout.

The contact edges 33 of the hinged door panels may be provided with a brushed aluminum trim. In one embodiment, the panels themselves may have a 0.75 inch core thickness with a 0.031 inch formica pearl laminate on the inside surface and a 0.90 inch ebonized wood veneer on the outside surface. It is contemplated that the panels be of a honeycombed, light weight metal or high strength plastic construction with solid edging to hold hinge screws.

Keeper means 47 may be provided with a rounded edge 57 as is shown in the embodiment of FIG. 4 to eliminate sharpness.

Accouterments such as a coat hook 61 may be provided about the enclosure surfaces for enhancing user convenience.

FIG. 1 also illustrates sink 54 which may be more conveniently accessed when a door according to the instant invention is in its occupied configuration than when the same door is in its unoccupied configuration, or when a standard door otherwise provided thereabout is closed.

Figure 5:
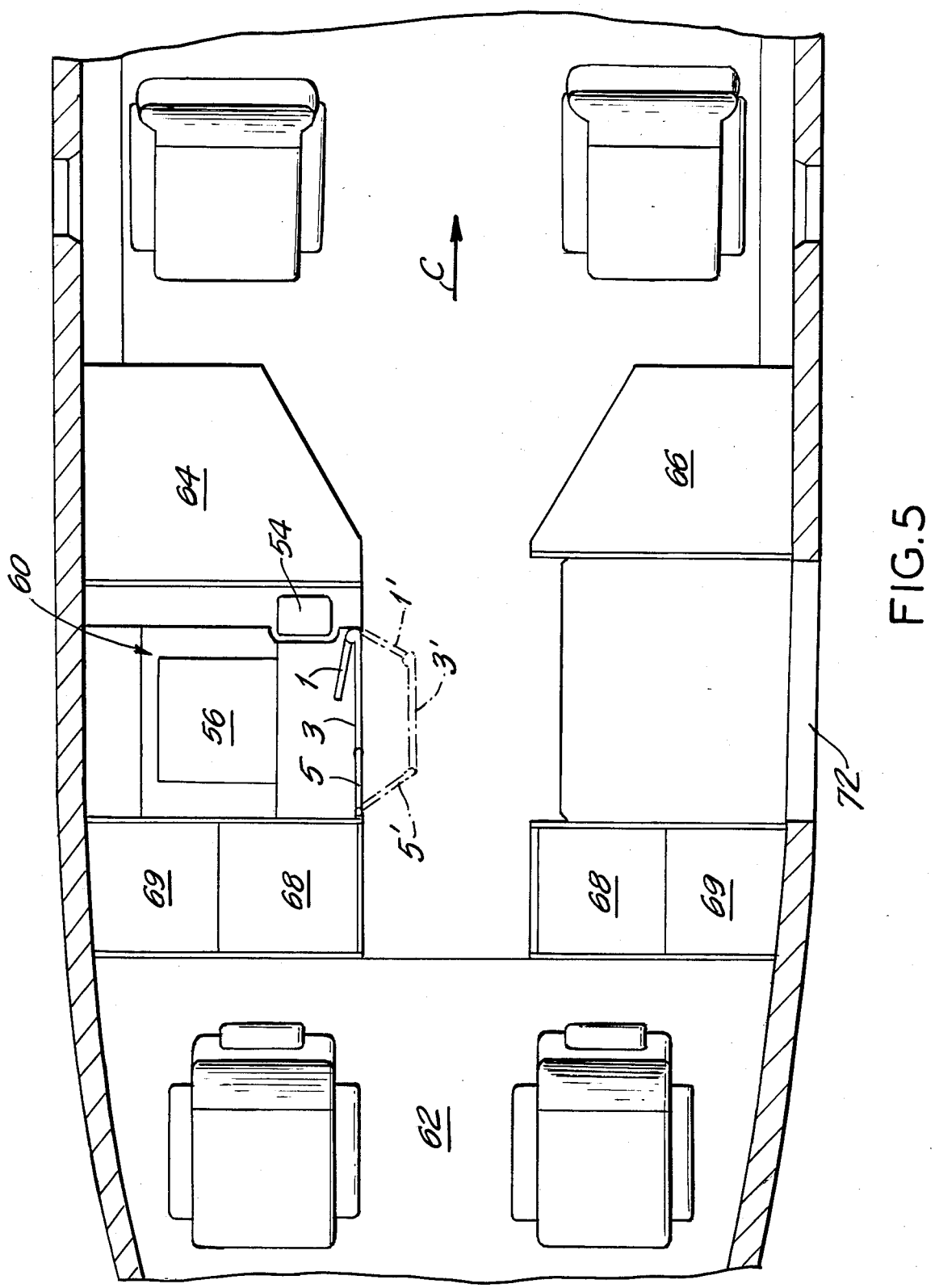
FIG. 5 illustrates a vehicle, such as an aircraft, including an expandable volume lavatory according to the instant invention.

FIG. 5 illustrates a vehicle, such as an aircraft, comprising a lavatory 60 including a hinged door assembly 1, 3, 5 (1', 3', 5') according to the instant invention. In the drawing of FIG. 5, 56 represents a toilet and 54 represents a sink. As may be readily seen from FIG. 5, when the door assembly 1, 3, 5 is in its unoccupied configuration, little leg room or maneuvering room is provided to the user of toilet 56 or sink 54.

However, when door assembly 1', 3', 5' is in its occupied configuration, with first hinged door panel 1' unfolded and repositioned, extra leg room is thereby made available to the user of toilet 56 and extra space in general is made available to the occupant for providing more convenient access to toilet 56 and sink 54.

Note that in the illustration of FIG. 5, the lavatory according to the instant invention is provided in the forward part of the aircraft where space is especially at a premium.

Lavatory 60 is thus able to be designed in close proximity to cockpit 62, radio racks 69, coat closets 68, and first and second galley portions 64, 66. Likewise, lavatory 60 is able to be provided in close proximity to entry door 72.

With the multiply hinged door lavatory according to the instant invention, an out-of-the-way lavatory is able to be provided in the forward section of an aircraft whereby crew members may avail themselves of lavatory services without intruding on passenger privacy otherwise provided throughout the remainder of the cabin in the direction of arrow C.

It will of course be understood that a room other than a lavatory may be constructed within the scope of the invention as comprising a two positioned hinged door. It will also be understood that the invention may be practiced with a variety of pivoting means replacing the hinge means disclosed, and a variety of materials going into the construction of the door panels and connection points.

It will further be understood that rooms such as lavatories equipped with hinged doors may be provided within air, land, sea or space vehicles or even within surface structures without in any way departing from the invention.

Although the proceeding has described in clear detail one or more particular embodiments of the instant invention, these embodiments should in no way be construed as limiting the spirit of the invention or the scope of the claims which follow.

I claim:

1. A room, comprising:
    a walled area enclosing a lavatory; a door-opening through said walled area; and a door having at least first, second, and third door panels; wherein said first door panel is pivotally mounted along a first edge thereof to a first edge of said door opening and at a second edge along a first edge of said second door panel, said second door panel being further pivotally mounted along a second edge thereof to a first edge of said third door panel, such that said door may be disposed in a first configuration having said first and second door panels substantially co-planar while said second edge of said second door panel is in mating engagement about a second edge of said door opening, said third door panel being then positioned within said walled area and wherein said door may be disposed in a second configuration wherein a second edge of said third door panel is in mating engagement about said second edge of said door opening, said first, second and third door panels being all positioned outside of said walled area, said room in said second configuration having a greater volume of of enclosure than said room in said first configuration.

2. A room is recited in claim 1, wherein said lavatory is provided within a vehicle.

3. A room as recited in claim 2, wherein said lavatory is provided on board an aircraft.

4. A room as recited in claim 2, wherein said lavatory is provided on board a spacecraft.

5. A door-closure for at least partially sealingly closing a door-entrance, comprising three contiguous pivotally connected door panels, a first of which may be pivotally coupled along an edge to a first edge of a door entrance, and linkage means extending between the first door panel and the third door panel, wherein in a first configuration the first two contiguous of said three pivotally connected door panels including said first may be aligned substantially co-planer to span a distance, the third panel forming an acute angle with said second panel and the linkage means pulling said third door panel into a tuck position with respect to said first door panel, and wherein in a second configuration, the third contiguous of said three hinged door panels may be positioned to effect said partial sealing closing in combination with said first two hinged door panels such that said edge of said first panel and the opposite edge of said third door panel span said distance, said linkage means in said second configuration providing structural support between the first and third door panels.

6. A room, comprising:
    a walled area; a door-opening through said walled area; and a door having first, second, and third door panels and linkage means extending between said first and third door panels; wherein said first door panel is pivotally mounted along a first edge thereof to a first edge of said door opening and at a second edge along a first edge of said second door panel, said second door panel being further pivotally mounted along a second edge thereof to a first edge of said third door panel, such that said door may be disposed in a first configuration having said first and second door panels substantially co-planar whicle said second edge of said second door panel is in mating engagement about a second edge of said door opening, said linkage means pulling said third door panel into a tuck position with respect to said first door panel within said walled area.

7. A room, as recited in claim 6, wherein said door may be disposed in a second configuration such that a second edge of said third door panel is in mating engagement about said second edge of said door opening, said first, second and third door panels being positioned outside of said walled area and said linkage means providing structural integrity to said door, said room in said second configuration having a greater volume of enclosure than said room in said first configuration.

8. A room as recited in claim 7, wherein said walled area encloses a lavatory.

9. A room is recited in claim 8, wherein said lavatory is provided within a vehicle.

10. A room as recited in claim 9, wherein said lavatory is provided on board an aircraft.

11. A room as recited in claim 9, wherein said lavatory is provided on board a spacecraft.

* * * * *